United States Patent
Saito et al.

(10) Patent No.: US 7,429,746 B2
(45) Date of Patent: *Sep. 30, 2008

(54) MEDICAL IMAGE RECORDING APPARATUS AND MEDICAL RADIOGRAPHY CASSETTE

(75) Inventors: Tomoko Saito, Machida (JP); Satoshi Honda, Machida (JP)

(73) Assignee: Konica Minolta Medical & Graphic, Inc. (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/655,410

(22) Filed: Jan. 19, 2007

(65) Prior Publication Data

US 2007/0114478 A1 May 24, 2007

Related U.S. Application Data

(63) Continuation-in-part of application No. 11/183,694, filed on Jul. 18, 2005, now Pat. No. 7,186,995.

(30) Foreign Application Priority Data

Jul. 23, 2004 (JP) ............................. 2004-215213
Jul. 23, 2004 (JP) ............................. 2004-215214

(51) Int. Cl.
*G21K 4/00* (2006.01)

(52) U.S. Cl. ...................... 250/581; 250/580

(58) Field of Classification Search ............. 250/581, 250/580
See application file for complete search history.

(56) References Cited

U.S. PATENT DOCUMENTS

2004/0062355 A1  4/2004  Van den Bergh et al.

FOREIGN PATENT DOCUMENTS

JP  59-17198  1/1984
JP  07-20591  1/1995

OTHER PUBLICATIONS

MatWeb Online Material Data Sheet for Barium Sulfate. [online] Material Property Data, retrieved on Jun. 15, 2006. Retrieved from the Internet: <URL: http://www.matweb.com/search/SpecificMaterial.asp?bassnum=EINOR0062a>.

*Primary Examiner*—David P. Porta
*Assistant Examiner*—Mark R Gaworecki
(74) *Attorney, Agent, or Firm*—Cantor Colburn LLP

(57) ABSTRACT

A medical image recording apparatus comprising: a recording medium to record an X-ray image transmitted through a subject; and an anti-scattering member for X-rays transmitted through the recording medium or an X-ray absorbing member for the X-rays transmitted through the recording medium, wherein the anti-scattering member or the X-ray absorbing member contains a composite material containing a metal or a compound having a specific gravity of not less than 3 excluding lead or a lead compound; and an X-ray absorptance of the composite material is 30-99.99%.

25 Claims, 5 Drawing Sheets

MEDICAL IMAGE RECORDING APPARATUS AND MEDICAL RADIOGRAPHY CASSETTE

This application is a continuation-in-part application of U.S. patent application Ser. No. 11/183,694, filed on Jul. 18, 2005 now U.S. Pat. No.7,186,995.

FIELD OF THE INVENTION

The present invention relates to a medical image recording apparatus having a recording medium on which a radiographic image is recorded and to a cassette for medical radiography having the recording medium.

BACKGROUND OF THE INVENTION

In the medical field, a lead foil (sheet) has been used widely for shielding X-rays or radiation. Lead is favorable as a material from a viewpoint of shielding X-rays or radiation (see Patent Document 1), however, it is not preferable from a viewpoint of an influence on environment, and the use thereof is strictly restricted for general parts and general apparatuses, and even in the case of medical parts and medical apparatuses having therein lead, "regimented disposal" is required, thus, searching for alternative material for lead is urgent business, especially in the field related to medical apparatuses.

Further, the aforesaid lead sheet is generally attached on each of members on the periphery of the recording medium (see Patent Document 2, for example). The lead sheet is structured so that a distance between the recording medium and a surface of the lead sheet is constant. For example, even in the case of a cassette for medical X-ray radiography, a lead sheet has been arranged between a recording medium such as a sheet film and a stimulable phosphor plate and a back plate of the cassette, for eliminating an influence of rear scattered X-ray in the course of radiography.

FIG. 7 shows a conventional example of the cassette for medical X-ray radiography. The conventional cassette for medical X-ray radiography shown in FIG. 7 is composed of front plate 201 that is positioned on the side where X-rays are irradiated, back plate 202 positioned on the side opposite to the front plate and of frame 203 positioned on the side of the outer circumference, and in the cassette, there housed recording medium plate 200 that is a sheet film or a stimulable phosphor plate on which an X-ray image is recorded. For eliminating an influence of rear scattered X-ray in the course of radiography, lead sheet 204 is arranged on an inner surface of back plate 202 and a distance between the recording medium plate 200 and a surface of lead sheet 204 is organized to be uniform.

When this lead sheet 204 provided on a cassette back plate 202 with a two-sided adhesive tape is not stuck uniformly and air bubbles are partially generated, it needs to be stuck again because an image is influenced. In this case, the lead sheet peeled off once is not flat enough and cannot be used for sticking again, thus, it has been necessary to use a fresh lead sheet, resulting in disposal of lead sheets.

A two-sided adhesive tape itself has its own thickness which is necessary to be compensated by the thickness of the back plate or of the recording medium itself, in order to keep the outer dimension of the cassette unchanged. Therefore, consideration on the design of the cassette has been needed to maintain the mechanical strength of the cassette, for example, the stiffness.

(Patent Document 1) Japanese Patent Publication Open to Public Inspection (hereafter referred to as JP-A) No. 59-17198

(Patent Document 2) JP-A No. 7-20591

SUMMARY OF THE INVENTION

An object of the present invention is to provide a medical image recording apparatus having a member related to holding a recording medium formed without using lead, which has a X-ray shielding function or a preventing function for rear scattered X-ray being comparative to those obtained by using lead, and to provide a cassette for medical radiography which has flexibility in designing outer dimensions and is able to fabricate without using lead.

One of the aspects of the present invention is a medical image recording apparatus comprising: a recording medium to record a radiographic image transmitted through a subject; and an anti-scattering member for X-rays transmitted through the recording medium or an X-ray absorbing member for the X-rays transmitted through the recording medium, wherein the anti-scattering member or the X-ray absorbing member contains a composite material containing a metal or a compound having a specific gravity of not less than 3 excluding lead or a lead compound; and an X-ray absorptance of the composite material is 30-99.99%.

DESCRIPTION OF THE PREFERRED EMBODIMENTS

For attaining the above mentioned object, a medical image recording apparatus in the present invention is one having therein a built-in recording medium that records a radiography image transmitted through a subject, and a member relating to holding the recording medium is made of composite material containing one or more kinds of metals or compounds having a specific gravity of not less than 3 excluding lead or a lead compound.

In this medical image recording apparatus, a member relating to holding the recording medium that records a radiographic image is made of a composite material containing one or more kinds of metals or compounds having a specific gravity of not less than 3 excluding lead or a lead compound, and therefore, it is possible to obtain a X-ray shielding function or a preventing function for rear scattered X-ray, which are comparative to those obtained by using lead.

It is preferable that the composite material mentioned above is a material wherein one or more kinds of metals or compounds having a specific gravity of not less than 3 excluding lead or a lead compound are dispersed in a resin material or a rubber material, in the medical image recording apparatus. As metals to be dispersed, tungsten, copper and molybdenum are appropriate. These metals are preferably used as a powder of several μm in diameter, in order not to cause uneven shielding of X-rays. Further, a part thereof can be replaced by a compound such as barium sulfate, strontium sulfate and calcium tungstate.

In this case, it is preferable that the composite material has specific gravity of 3-15.

Figure 1:
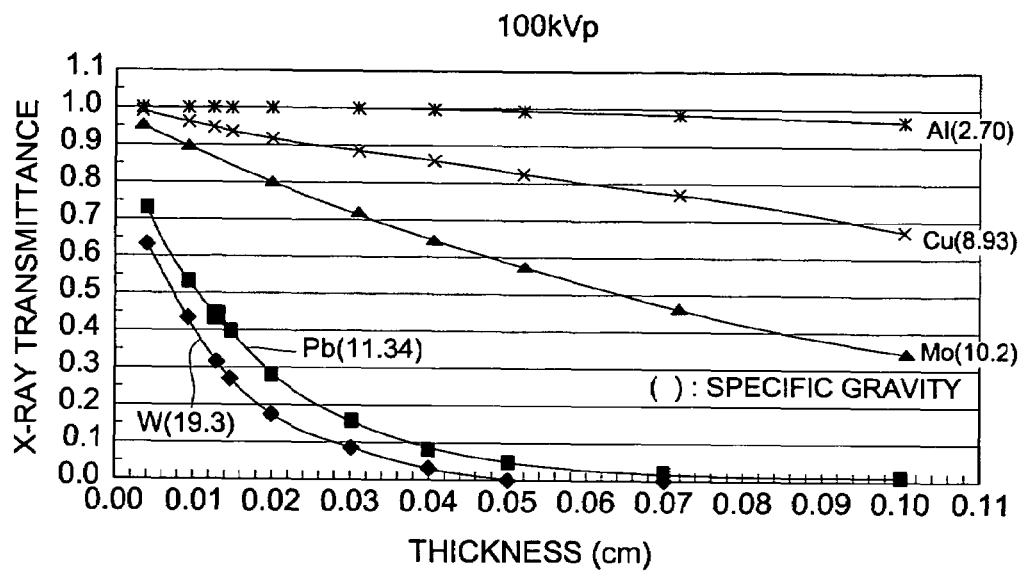
FIG. 1 is a diagram showing relationships between X-ray transmittance (tube voltage 100 kVp) and thicknesses for each type of metal.

FIG. 1 shows relationships between X-ray transmittance (tube voltage 100 kVp) and thicknesses for various metals. As shown in FIG. 1, X-ray shielding factor (attenuation factor) of a metal having high specific gravity such as tungsten (W) is greater than that of conventionally utilized lead (Pb), and even in the case of composite material containing tungsten, its thickness can be made to be thinner than or equal to that of lead. In the case of a metal of which specific gravity is lower than that of lead such as copper (Cu) and molybdenum (Mo), a larger thickness than that of lead is necessary.

It is further preferable that the composite material is constructed to be in a form of a sheet, and specific gravity of the composite material sheet is higher than that of the composite material sheet immediately after casting. Since specific gravity of the composite material sheet is increased by compressing the composite material sheet after it is formed into a sheet, it is possible to make X-ray shielding factor of the composite material sheet to be greater than expected for the thickness of the composite material sheet. In the case of this compression processing, it is preferable to apply pressure at the temperature that is the same as or higher than the softening point or the melting point of the resin material or of the rubber material.

It is further possible to provide composite materials inexpensively by replacing a part of the relatively expensive tungsten contained in the composite material with a relatively inexpensive substance such as, for example, barium sulfate, strontium sulfate, calcium tungstate, iron or copper.

The cassette for medical radiography of the present invention contains therein a recording medium on which an X-ray image transmitted through a subject can be recorded, wherein at least one member provided on one side of the recording medium opposite to the subject side is formed by using a composite material including one or more metals or compounds having a specific gravity of not less than 3 excluding lead or salts of the metals.

In the cassette for medical radiography of the present invention, since at least one member provided on the side of the recording medium opposite to the subject side is formed by using a composite material including one or more metals or compounds having a specific gravity of not less than 3 excluding lead or a lead compound, no lead sheet nor two-sided adhesive tape for adhering the lead sheet is needed, whereby, the flexibility in designing outer dimensions of the cassette is increased, and it is possible to construct the cassette without using lead. Further, sticking procedure of the lead sheet is not needed, and the assembling steps of the cassette are reduced, which is preferable for manufacturing. The composite material is preferably a material in which powder of a metal or a compound having a specific gravity of not less than 3 excluding lead or a lead compound is dispersed or kneaded in the state of powder.

In the cassette for medical radiography mentioned above, it is preferable that a front member arranged on the subject side of the recording medium and a back member provided on the other side are combined to form an inner space in which the recording medium is installed, and the back member is made of the composite material.

It is further preferable that the back member has a frame member on its outer circumference, and the frame member is monolithically formed with the back member by using the composite material. Accordingly, the flexibility in designing internal dimensions of the cassette is increased, and the number of fablicating steps is reduced, which is preferable for production.

The recording medium may be any of a film, a flat panel detector (FPD) or a stimulable phosphor to be used for CR (computed radiography).

Preferred embodiments for practicing the present invention will be explained as follows, referring to the drawings.

Figure 2:
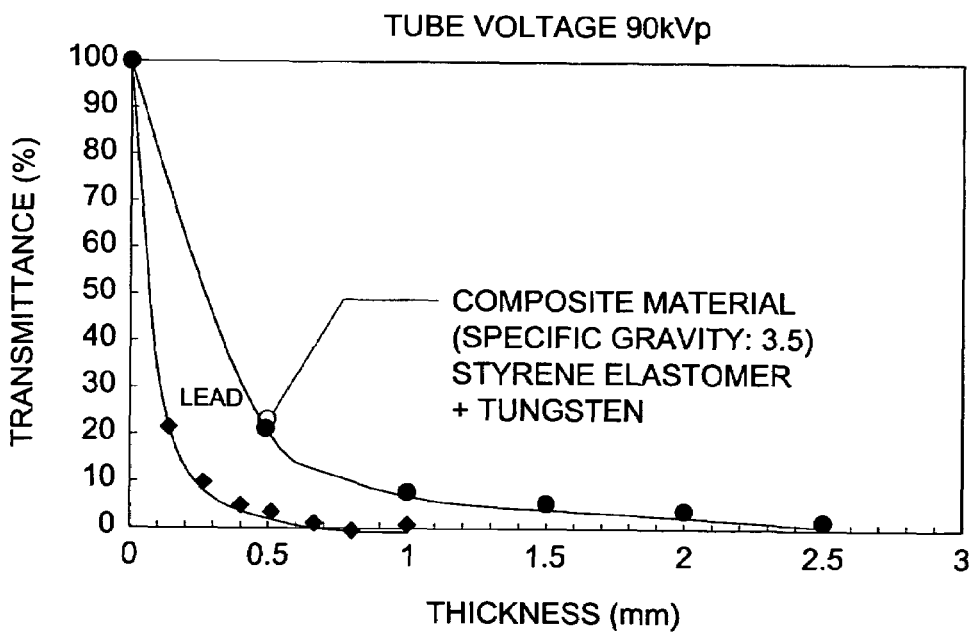
FIG. 2 is a diagram showing how X-ray transmittance (tube voltage 90 kVp) of a composite material containing tungsten in the present embodiment varies depending on a sheet thickness.

First, composite materials preferably applied to the medical image recording apparatus in the present embodiment will be explained, referring to FIG. 2. FIG. 2 is a diagram showing the variation of X-ray transmittance (tube voltage 90 kVp) of composite material containing tungsten with changing the thickness of the composite material. FIG. 2 also shows that of a lead sheet for comparison.

A composite material shown in FIG. 2 is one wherein tungsten powder is dispersed in a resin, and specific gravity of the whole is made to be 3.5. This composite material is a composite material sheet wherein powder equivalent to 0.1 mm thickness of tungsten is dispersed in styrene elastomer to form a sheet, and FIG. 2 shows that a thickness of the composite material sheet equivalent to 0.13 mm thickness of lead sheet is 0.5 mm. Owing to this composite material sheet wherein tungsten powder is dispersed in styrene elastomer, a function for shielding X-rays and for preventing rear scattered X-rays which are comparative to those of a lead sheet can be obtained without using lead. As rubber materials, natural rubbers and synthetic rubbers such as a chloroprene rubber (CR) and a styrene-butadiene rubber (SBR) are preferably usable. The X-ray transmittance of the composite material sheet of the present invention is preferably 0.01-70% (X-ray absorptance is 30-99.99%), more preferably 0.01-50% (X-ray absorptance is 50-99.99%), and specifically preferably 0.01-30% (X-ray absorptance is 70-99.99%). The above mentioned X-ray absorptance (%) represents a value obtained by substracting an X-ray transmittance from 100%. The X-ray transmittance of the composite material sheet of the present invention per thickness of 0.1 mm is preferably not less than 10%, more preferably not less than 20%, further more preferably not less than 30%, and specifically preferably not less than 50%.

The composite material sheet can be formed through extrusion or molding, and in this case, appropriate binders are added properly.

The composite material sheet wherein powder of tungsten is dispersed in styrene elastomer has flexibility, whereby the composite material sheet can be stuck on a surface of the member to be in close contact for shielding X-ray, and it is relatively easy to stick on or peel off the surface of the member.

By giving compression processing by a calender roll or a pressing machine to the composite material sheet formed through extrusion or molding, and thereby, by increasing specific gravity thereof, X-ray shielding factor can be made greater for the thinner composite material sheet.

FIRST EMBODIMENT

Figure 3:
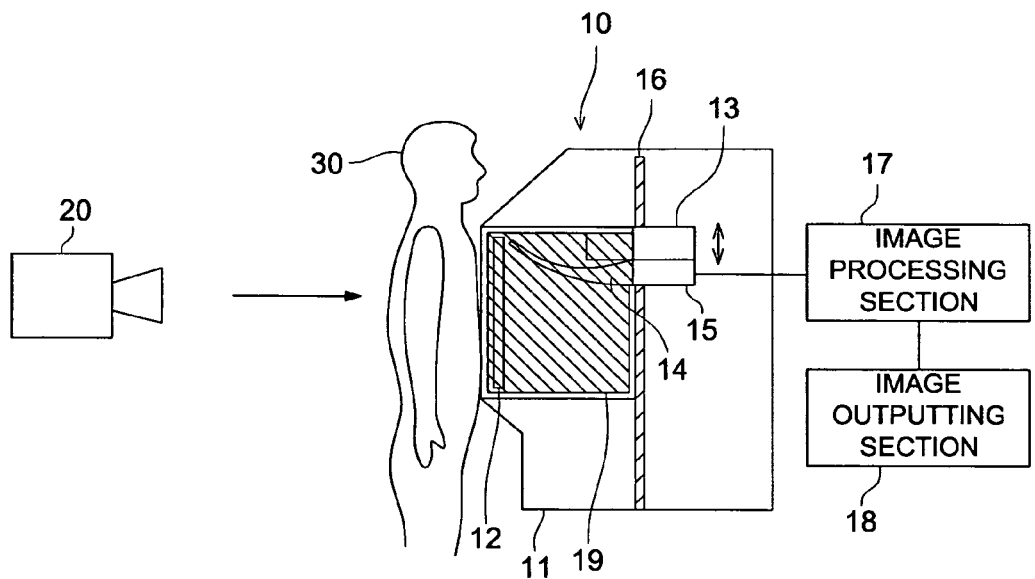
FIG. 3 is a side view showing schematically the medical X-ray image recording apparatus of the first embodiment.

FIG. 3 is a side view showing schematically the medical radiographic image recording apparatus in the First Embodiment.

As shown in FIG. 3, medical radiographic image recording apparatus 10 to be used for CR (computed radiography) has in its casing rectangular flat type radiographic image recording panel 12 composed of stimulable phosphors arranged on the front side of the apparatus, photo-scanning section 13 that irradiates radiographic image recording panel 12 with a laser beam as an excitation light while conducting main scanning, photo-guiding section 14 that converges and guides for photo-stimulated emission light excited and generated by a laser beam coming from the photo-scanning section 13 and photo-detector 15 equipped with a photo-multiplier that detects light coming from the photo-guiding section 14.

The radiographic image recording panel 12 is arranged on the front side of the casing 11, and X-ray emitted from X-ray source 20 is projected on subject 30, and X-rays which are transmitted through subject 30 and have intensity distribution are recorded on the radiographic image recording panel 12 as a latent image.

In the casing 11 of the medical radiographic image recording apparatus 10 in FIG. 3, there is arranged X-ray sheltering section 19 in a shape of a rectangular parallelepiped in a way that it surrounds a space shown with hatching in FIG. 3 including the radiographic image recording panel 12, a part of photo-scanning section 13 and photo-guiding section 14. On an outer surface or an inner surface of the X-ray shielding section 19, there stuck a composite material sheet wherein tungsten powder as in FIG. 2 is dispersed. An outer circumference of the radiographic image recording panel 12 is held on the X-ray shielding section 19 on the front side of the casing 11.

The radiographic image recording panel 12 on which X-ray images are recorded is irradiated with a laser beam from the photo-scanning section 13 through main scanning, while photo-scanning section 13, photo-guiding section 14 and photo-detector 15 are moving vertically along sub-scanning guide section 16 composed of ball-screws and others, through sub-scanning in FIG. 3. Photo-stimulated emission light generated by irradiation of the laser beam enters a photomultiplier of the photo-detector 15 through the photo-guiding section 14 to be converted photo-electrically, and electric signals are outputted from the photo-detector 15.

X-ray images are read from the radiographic image recording panel 12 as stated above, and electric signals thus obtained are subjected to image processing by image processing section 17, and are outputted from image outputting section 18 as image signals. The image signals are, for example, transmitted to data base server to be stored, or transmitted to a printer to form an image on a film to output it.

In the medical X-ray image recording apparatus 10 wherein the radiographic image recording panel 12 is held by the X-ray shielding section 19 as stated above, the inside of the X-ray shielding section 19 can be sheltered against X-rays in the same way as in a lead sheet, thus, rear scattered light caused by X-ray irradiation can be sheltered and rear scattering of X-rays can be prevented.

A lead sheet has been stuck on the X-ray shielding section 19 with a two-sided adhesive tape, and when the lead sheet is peeled off for the purpose of maintenance of the inside of the X-ray shielding section 19, flatness cannot be maintained and a fresh lead sheet has been used, resulting in an increase of lead sheets to be disposed. In contrast to this, by using, as in the present embodiment, a composite material sheet wherein tungsten powder is dispersed as in FIG. 2, the composite material sheet can be stuck again, and even in the case of disposal, the composite material sheet is not regulated, which is different from lead.

Incidentally, in FIG. 3, when the X-ray shielding section 19 is not provided in particular, a composite material sheet as in FIG. 2 may also be stuck on an outer surface or an inner surface of casing 11.

SECOND EMBODIMENT

Figure 4:
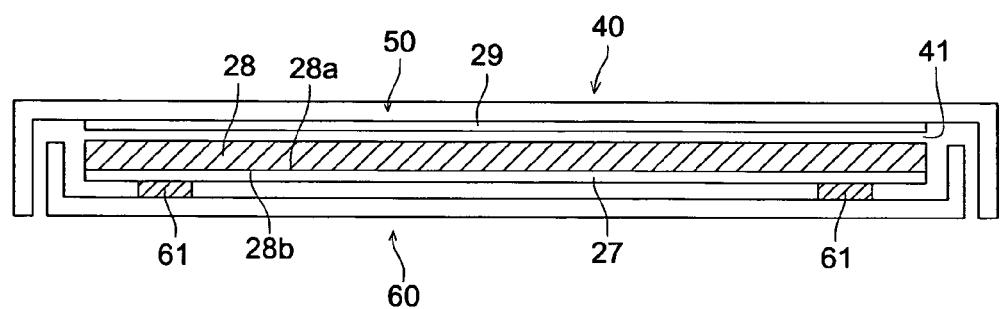
FIG. 4 is a cross-sectional view of main portions showing a medical X-ray image recording apparatus of the first embodiment.

FIG. 4 is a sectional view of primary portions showing a cassette for medical X-ray radiography in the Second Embodiment to be used for CR (computed radiography).

As shown in FIG. 4, cassette for medical X-ray radiography 40 is composed of front member 50 and back member 60, and rectangular flat type radiographic image recording panel 28 is housed in inner space 41 formed between the front member 50 and the back member 60. Stimulable phosphors are used to construct the radiographic image recording panel 28 on which an X-ray image is recorded as a latent image, and it is read in the same way as in FIG. 3 in a reading apparatus after being recorded.

The cassette for medical X-ray radiography 40 is used in a way that surface 28a of the radiographic image recording panel 28 is irradiated with X-ray under the condition that a subject is positioned on the front member 50 side, and on reverse side 28b of the radiographic image recording panel 28, there stuck composite material sheet 27 wherein tungsten power as in FIG. 2 is dispersed. The composite material sheet 27 is held and fixed by plural pedestals 61 arranged on the end portion together with the radiographic image recording panel 28. Further, on an inner surface of the front member 50, there stuck flat type buffer 29 composed of non-woven fabric.

In the case of the cassette for medical X-ray radiography 40 in FIG. 4, composite material sheet 27 is stuck on the reverse side 28b of the radiographic image recording panel 28 so that it is held by the cassette for medical X-ray radiography 40 as stated above, whereby, the cassette 40 can be sheltered against X-rays in the same way as in a lead sheet, thus, rear scattering of X-rays can be prevented by blocking scattered radiation caused by X-ray irradiation.

THIRD EMBODIMENT

Figure 5:
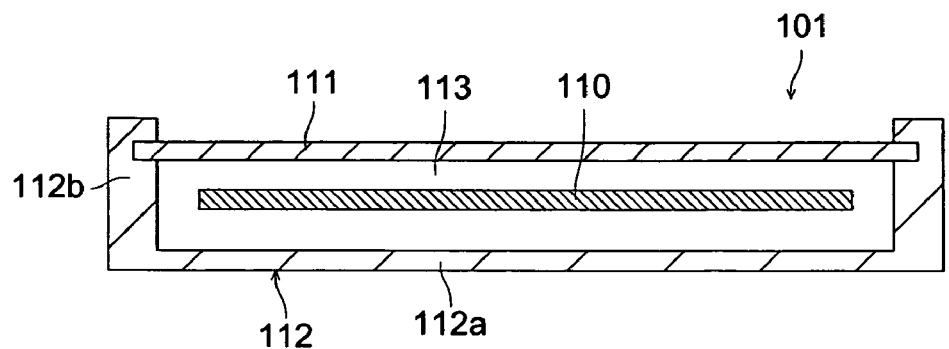
FIG. 5 is a sectional side view showing schematically the cassette for medical radiography of the third embodiment.

Next, the cassette for medical radiography (hereafter referred to as medical use cassette) in the present embodiment will be explained, referring to the drawings. FIG. 5 is a sectional side view showing schematically the cassette for medical radiography in the present embodiment.

Medical use cassette 101 shown in FIG. 5 is provided with rectangular flat type front member 111 that is positioned on the subject side and is irradiated with X-rays transmitted through the subject and with monolithically formed member 112 wherein rectangular flat type back member 112a that is positioned to face the front member 111 and frame member 112b that forms an outer circumferential surface of the cassette 101 are monolithically formed. In inner space 113 formed by the front member 111 and the monolithically formed member 112, there housed recording medium plate 110 made of stimulable phosphor on which X-ray images transmitted through a subject are recorded. The monolithically formed member 112 is constructed to have a U-shaped cross-section in which frame members 112b stand almost perpendicularly against the back member 112a.

The monolithically formed member 112 is made of a composite material containing one or more metals or compounds having a specific gravity of not less than 3 excluding lead or a lead compound, and it can be manufactured by using composite materials wherein, for example, tungsten powder having specific gravity of 19.3 is dispersed in a resin and a specific gravity of the whole is made to be, for example, 3.5. As a composite material in which the aforesaid metal or the salt is dispersed, high specific gravity resins made by Kanebou Gosen Co. wherein tungsten powder is dispersed in polyamide resins can specifically be used.

In medical use cassette 101 shown in FIG. 5, when back member 112a and frame member 112b are made of composite materials containing a metal or a compound having a specific gravity of not less than 3 excluding lead or a salt of the metal, neither conventional lead sheet nor a two-sided adhesive tape is needed, because the back member 112a and the frame member 112b themselves have X-ray shielding characteristics. Accordingly, cassette 101 can be constructed to be thin, and the flexibility for designing the cassette is increased, because thicknesses for the lead sheet and the two-sided adhesive tape are not necessary to be included. Further, conventional sticking step of the lead sheet is not needed, whereby the number of steps for assembly of cassettes is reduced, preferably.

Further, in the case of disposal of cassettes, special management for disposal is not necessary, because no lead is used in cassette 101. In addition, by monolithically forming back member 112a and frame member 112b as united member 112, the flexibility for designing internal dimensions is increased, and the number of steps for assembly of cassettes is reduced, preferably.

When the cassette for medical radiography is of the type to have a buffer member and a member that helps reading recording medium plate 110 between the back member 112a and the recording medium plate 110, it is possible to form the buffer member and the member which helps reading by using composite materials containing a metal or a compound having a specific gravity of not less than 3 excluding lead or a lead compound.

Figure 6:
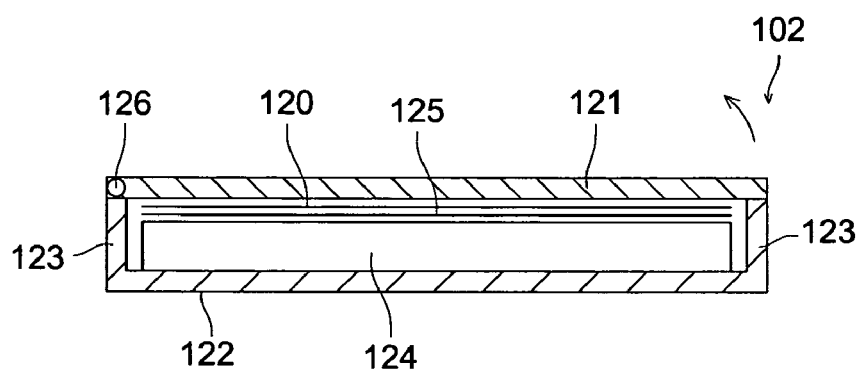
FIG. 6 is a sectional side view showing schematically another type of cassette for medical radiography of the third embodiment.
Figure 7:
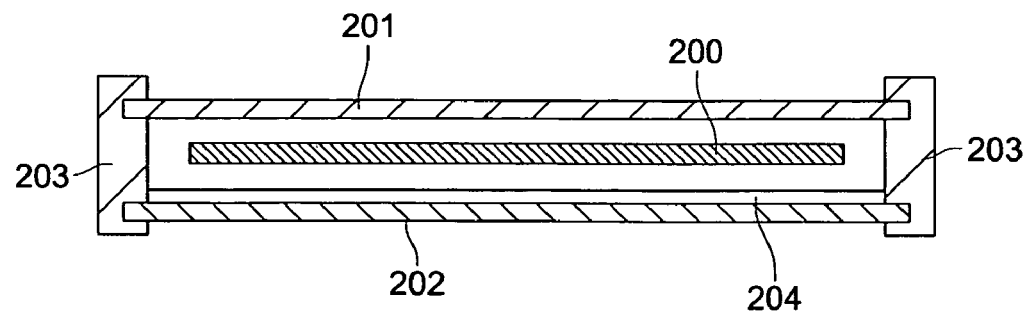
FIG. 7 is a sectional side view showing schematically a conventional example of the cassette for medical radiography.

Next, a medical use cassette having therein an X-ray radiographic film will be explained, referring to FIG. 6. FIG. 6 is a sectional side view showing schematically a medical use cassette having therein an X-ray radiographic film.

Medical use cassette 102 shown in FIG. 6 is provided with rectangular flat type front member 121 that is positioned on the subject side of the X-ray radiographic film and is irradiated with X-rays transmitted through the subject, and with rectangular flat type back member 122 that is positioned to face the front member 121. The front member 21 is constructed to be capable of rotating around rotating part 126 which serves as a rotating axis.

In the inner space formed by the front member 121 and the back member 122, there housed rectangular X-ray radiographic film 120 on which X-ray images transmitted through a subject are recorded. Elastic member 124 is housed, as a cushion material, in a space formed by back member 122 and frame member 123, then, radiosensitizing screen 125 is placed on the elastic member 124 and X-ray radiographic film 120 is arranged between radiosensitizing screen 125 and the front member 121.

The elastic member 124 contains, in foaming materials such as foaming resins, one or more metals or compounds having a specific gravity of not less than 3 excluding lead or a lead compound, and for example, it can be made by kneading tungsten powder in a foaming resin, followed by foaming the resin.

Before conducting X-ray radiography by using the medical use cassette 102, the front member 121 is rotated, to be opened, around rotating portion 126 serving as a rotating axis, then, radiosensitizing screen 125 and unexposed X-ray radiographic film 120 are set on the elastic member 124, and after that, the front member 121 is rotated to cover the inside. In this case, the elastic member 124 functions as a cushion so that the radiosensitizing screen 125 and the X-ray radiographic film 120 may be brought into close contact evenly with each other.

In the medical use cassette 102 shown in FIG. 6, when a metal or a compound having a specific gravity of not less than 3 excluding lead or a lead compound is contained in the elastic member 124 that brings the radiosensitizing screen 125 and the X-ray radiographic film 120 into close contact evenly, X-ray shielding effect is more than that of the conventional medical use cassette, whereby, cassette 102 can be constructed to be thinner. Further, in the case of disposal of cassettes, special management for disposal is not necessary, because no lead is used in cassette 102.

There have been explained preferred embodiments for practicing the present invention, however, the present invention is not limited thereto, and disclosed embodiments can be varied without departing from the spirit and scope of the present invention. For example, a flat panel detector (FPD) may be installed in the inner space 113 in place of recording medium plate 110 in FIG. 5, by using the structure of a cassette shown in FIG. 5.

Further, in the medical use cassette 101 in FIG. 5, back member 112a and frame member 112b are monolithically constructed, however, these may also be constructed separately each other, and in this case, composite materials containing a metal or a compound having a specific gravity of not less than 3 excluding lead or a lead compound may also be used for the back member, and the frame member may also be made of the same composite material.

FOURTH EMBODIMENT

Figure 8:
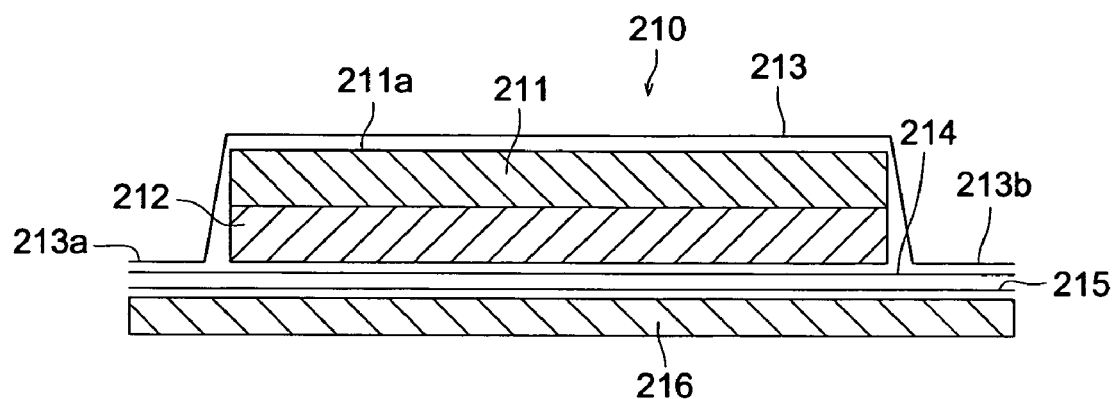
FIG. 8 is a schematic view of a cross-section of the stimulable phosphor plate according to the forth embodiment.

FIG. 8 is a schematical view of a cross-section of the stimulable phosphor plate according to the forth embodiment.

Stimulable phosphor plate 210 shown in FIG. 8 contains: stimulable phosphor layer 211 having image recording surface 211a on which image recording is carried out with the X-rays passed through the object; support 212 which supports stimulable phosphor layer 211; sealing film 213 such as a PET film which fully covers image recording surface 211a of stimulable phosphor layer 211; sealing film 214 which fully covers the reverse surface of support 212 to image recording surface 211a; holding member 216 made of a resin which is adhered to sealing film 214 with double sided adhesive tape 215 in order to maintain the entire flatness of stimulable phosphor layer 211 and support 212. Stimulable phosphor plate 210 is formed into a rectangle and flat panel as a whole.

Sealing films 213 and 214 are adhered each other at edge portions 213a and 213b, for example, by welding, while stimulable phosphor layer 211 and support 212 are sandwiched between sealing films 213 and 214, whereby inside of stimulable phosphor plate 210 is sealed.

Support 212 contains a composite material containing a metal or a compound having a specific gravity of not less than 3 excluding lead or a lead compound. Also, sealing film 214 provided on the reverse surface of support 212 and holding member 216 contain a composite material containing a metal or a compound having a specific gravity of not less than 3 excluding lead or a lead compound.

Stimulable phosphor layer 211 is formed on support 212 via a coating method or vacuum evaporation. The stimulable phosphor layer may contain a stimulable phosphor, for example, disclosed in JP-A No. 11-295828 which are listed below:

1. Phosphors represented by the following formula:

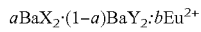
$$a\text{BaX}_2 \cdot (1-a)\text{BaY}_2 : b\text{Eu}^{2+}$$

wherein X and Y each represent at least one of F, Cl, Br and I; X≠Y; and a and b meet the following conditions:

$$0<a<1 \text{ and } 10^{-5}<b<10^{-1}.$$

2. Alkali halide phosphors represented by the following formula:

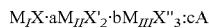
$$M_I X \cdot aM_{II} X'_2 \cdot bM_{III} X''_3 : cA$$

wherein $M_I$ represents at least one of the alkali metals of Li, Na, K, Rb, and Cs; and $M_{II}$ represents at least one of the divalent metals of Be, Mg, Ca, Sr, Ba, Zn, Cd, Cu, and Ni; $M_{III}$ represents at least one the tervalent metals of Sc, Y, La, Ce, Pr, Nd, Pm, Sm, Eu, Gd, Tb, Dy, Ho, Er, Tm, Yb, Lu, Al, Ga, and In; X, X', and X" each represent at least one of the halogen atoms of F, Cl, Br and I; A represents at least one of the metals of Eu, Tb, Ce, Tm, Dy, Pr, Ho, Nd, Yb, Er, Gd, Lu, Sm, Y, Tl, Na, Ag, Cu and Mg; and a, b and c meet the following conditions:

$$0 \leq a<0.5, 0 \leq b<0.5 \text{ and } 0 \leq c<0.2$$

3. Phosphors represented by the following formula:

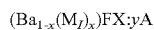
$$(\text{Ba}_{1-x}(M_I)_x)\text{FX}:y\text{A}$$

wherein $M_I$ represents at least one of the metals of Mg, Ca, Sr, Zn, and Cd; X represents at least one of Cl, Br, and I; A represents at least one of the metals of Eu, Tb, Ce, Tm, Dy, Pr, Ho, Nd, Yb, and Er; and x and y meet the following conditions:

$$0 \leq x<0.6 \text{ and } 0 \leq y<0.2$$

4. Phosphors represented by the following formula:

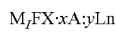
$$M_I \text{FX} \cdot x\text{A}:y\text{Ln}$$

wherein $M_I$ represents at least one of the metals of Mg, Ca, Ba, Sr, and Zn and Cd; A represents at least one of BeO, MgO, CaO, SrO, BaO, ZnO, $Al_2O_3$, $Y_2O_3$, $La_2O_3$, $In_2O_3$, $SiO_2$, $TiO_2$, $ZrO_2$, $GeO_2$, $SnO_2$, $Nb_2O5$, $Ta_2O_5$ and $ThO_2$: Ln represents at least one of the metals of Eu, Tb, Ce, Tm, Dy, Pr, Ho, Nd, Yb, Er, Sm, and Gd; X represents at least one of Cl, Br, and I; and x and y meet the following conditions:

$$5 \times 10^{-5} \leq x \leq 0.5 \text{ and } 0<y \leq 0.2.$$

In stimulable phosphor plate 210 shown in FIG. 8, as described above, each of support 212, sealing film 214 and holding member 216 each being provided on the reverse side of image recording surface 211a of stimulable phosphor layer 211 to the subject side contains a composite material containing a metal or a compound having a specific gravity of not less than 3 excluding lead or a lead compound. Accordingly, no lead sheet is necessary to obtain an enough X-ray shielding effect, whereby the effect of rear scattered X-rays is eliminated, and the thickness of stimulable phosphor plate 210 can be made smaller, resulting in allowing free design in the thickness direction of the stimulable phosphor plate.

Figure 12:
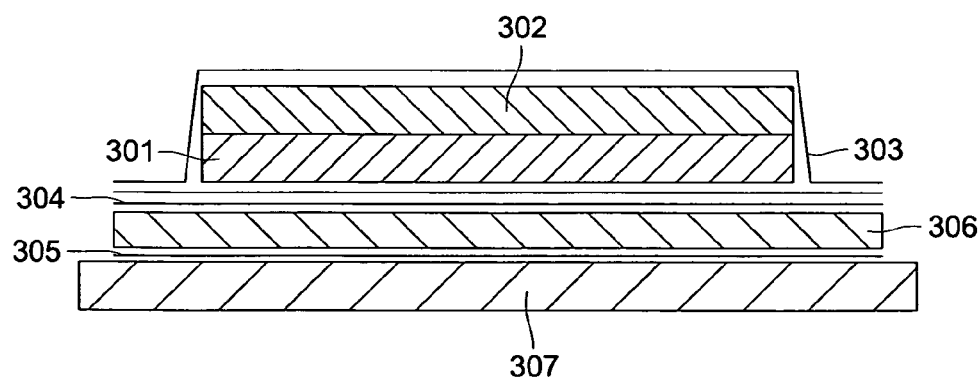
FIG. 12 is a schematic cross-sectional view of a conventional stimulable phosphor plate.

An example of a constitution of a conventional stimulable phosphor plate is shown in FIG. 12. In such a stimulable phosphor plate, stimulable phosphor layer 302 is formed on support 301 via a coating method or vacuum evaporation; support 301 having thereon stimulable phosphor layer 302 is sealed with sealing film 303 containing such as PET followed by adhering to lead sheet 306 using double sided adhesive tape 304; and on the surface of lead sheet 306 reverse to the stimulable phosphor layer side, tray 307 is adhered. Support 301 contains PET when stimulable phosphor layer 302 is formed via a coating method, and support 301 contains a carbon fiber mixed resin material or a metallic material such as aluminum when stimulable phosphor layer 302 is formed via vacuum evaporation. As described above, adhering processes on the both surfaces of lead sheet 306 have been necessary in a manufacturing process of a conventional stimulable phosphor plate, which is a doubled process resulting in a poor fabrication yield or a low workability. Also the thickness of a stimulable phosphor plate has been increased due to the use lead sheet 306 and double sided adhesive tapes 304 and 305.

However, in the present invention, since there is no need to use the lead sheet and the double sided adhesive tape, stimulable phosphor plate 210 can be fabricated thinner.

Also, since the step to adhere the lead sheet can be eliminated, the production process of the stimulable phosphor plate can be simplified. Further, since no lead sheet is used, there is no restriction to follow when the stimulable phosphor plate is disposed.

A specific example of the constitution of stimulable phosphor plate 210 shown in FIG. 8 will be described below, however, the present invention is not limited thereto.

When stimulable phosphor layer 211 is formed via a coating method, a composite material prepared by dispersing 50% by volume of tungsten powder in PET is used as support 212. The thickness of support 212 is 0.2 mm. Alternatively, the composite material may be prepared by dispersing 50% by volume of tungsten powder in PET mixed with a fibrous resin. A composite material prepared by dispersing 50% by volume of tungsten powder in PET is used as sealing film 214. The thickness of sealing film 214 is 0.2 mm. A composite material prepared by dispersing 10% by volume of tungsten powder in an epoxy resin is used as holding member 216. The thickness of holding member 216 is 1 mm.

When stimulable phosphor layer 211 is formed via a vacuum evaporation method, a composite material prepared by dispersing 10% by volume of tungsten powder in a resin added with carbon fibers is used as support 212. The thickness of support 212 is 1 mm. The composite materials applicable for sealing film 214 and holding member 216 may be respectively the same as described above.

Further, sealing film 214 and holding member 216 may be formed monolithically, for example, using a composite material prepared by dispersing 8.5% by volume of tungsten powder in an epoxy resin added with glass fibers, the thickness being 1.2 mm. In this case, as shown in the cross-sectional view of the main portion of the stimulable phosphor plate in FIG. 9, sealing film 213 can be directly adhered to holding member 216, for example, by welding at edge portion 213a. By adopting the constitution shown in FIG. 9, double sided adhesive tape 215 used in FIG. 8 becomes unnecessary, resulting in eliminating the step of adhering double sided adhesive tape 215, which is favorable for production.

FIFTH EMBODIMENT

Figure 9:
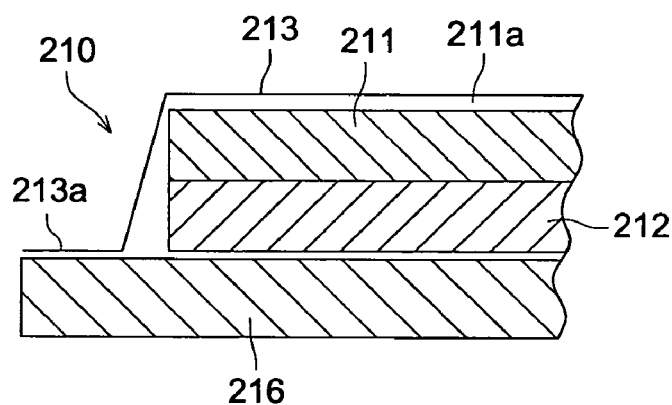
FIG. 9 is a schematic cross-sectional view of a main portion of another constitution of a stimulable phosphor plate according to the forth embodiment.
Figure 10:
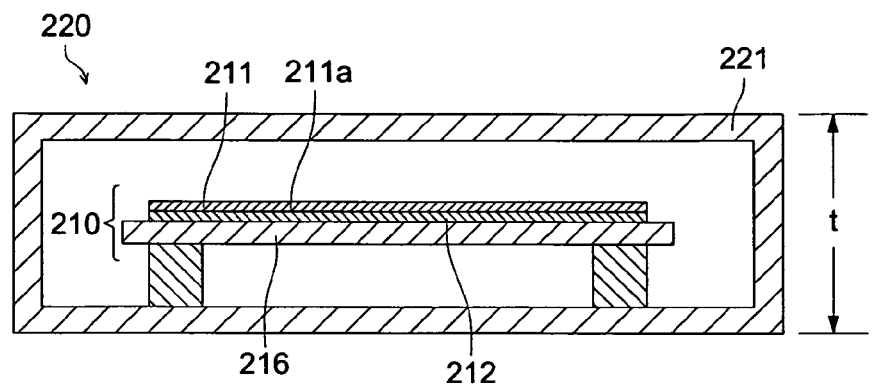
FIG. 10 is a schematic view of a cross-section of the CR cassette according to the fifth embodiment.

FIG. 10 illustrates a cross section view of a CR cassette according to the fifth embodiment. In cassette 220 for CR of FIG. 10, stimulable phosphor plate 210 of FIG. 8 or 9 is accommodated in rectangle and plane shaped housing 221 made of a resin material. CR cassette 220 of FIG. 10 corresponding to the image pick-up modality of CR (computed radiography), in which a subject (patient) is located upward of CR cassette 220 in FIG. 10, and image information of the subject is recorded on stimulable phosphor layer 211 of stimulable phosphor plate 210 by irradiating X-rays. Then, stimulable phosphor plate 210 is taken out from the inside of CR cassette 220, and stimulable phosphor layer 211 is scanned with excitation light to emit photo-stimulated light which is converted to an electrical signal using a photomultiplier to obtain electrical image information.

By using CR cassette 220 of FIG. 10, the thickness of a cassette can be reduced since the thickness of stimulable phosphor plate 210 can be reduced as shown in FIGS. 8 and 9, and the use of lead plate becomes unnecessary. Further, the flexibility in design in the thickness direction of the cassette is increased.

Figure 11:
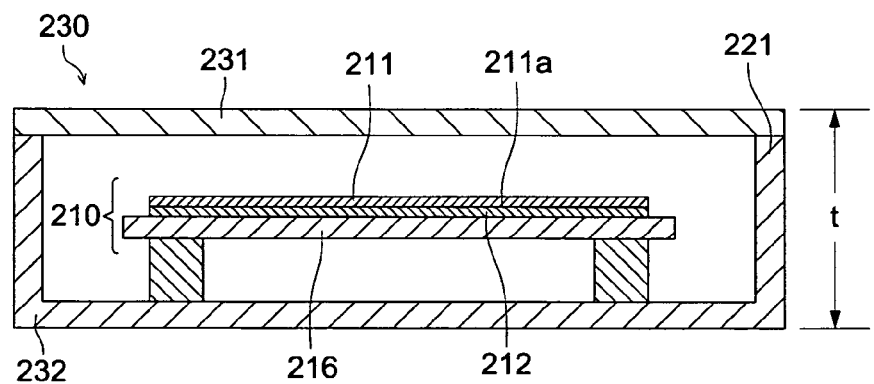
FIG. 11 is a schematic cross-sectional view of another constitution of the CR cassette according to the fifth embodiment.

Another example of constitution of CR cassette is shown in FIG. 11. CR cassette 230 constitutes a housing containing front member 231 made of a resin material which is provided in the subject side of the stimulable phosphor plate and back member 232 which is provided in the opposite side of the stimulable phosphor plate, and, in the housing, stimulable phosphor plate 210 is accommodated. By using the composite material of the present invention containing a metal or a compound having a specific gravity of not less than 3 excluding lead or a lead compound to prepare back member 232, a lead sheet provided in the inside of the back member becomes unnecessary. In a case when stimulable phosphor plate 210 cannot sufficiently prevent the rear scattering of X-rays, the rear scattering of X-rays can be sufficiently eliminated by employing the constitution of CR cassette as shown in FIG. 11.

By using CR cassette 230 of FIG. 11, the use of a lead plate and a double sided adhesive tape which have conventionally been used becomes unnecessary, and the thickness of a cassette can be reduced, whereby the flexibility in designing the cassette in the thickness direction is improved.

Also, with respect to CR cassettes 220 and 230 shown in FIGS. 10 and 11, since no lead sheet is used, there is no restriction to follow when these stimulable phosphor plates are disposed As a metal having a specific gravity not less than 3 excluding lead, molybdenum and copper, for example, may also be used in addition to tungsten. As an example of a compound having a specific gravity of not less than 3 excluding a lead compound, barium sulfate, strontium sulfate and calcium tungstate are listed. These salts may be used together with a heavy metal such as tungsten by replacing a part of the metal. As barium sulfate materials, B-30, B-33, B-34 and B-35 are preferably usable, these materials being subjected to a surface treatment so as to have an excellent coating property.

EXAMPLES

Next, Examples 1 and 2 of the present invention will be explained. Example 1 is one wherein the specific gravity of the composite material sheet is increased by compressing the composite material sheet after formed. Example 2 is a composite material sheet wherein a part of tungsten power is replaced by barium sulfate.

Example 1

The composite material sheet wherein powder of tungsten is dispersed in styrene elastomer resin, and a thickness is 0.5 mm and specific gravity is 3.5, was formed. Then, a calender roll was used under the conditions of 150° C. and pressure $4.9 \times 10^2$-$3.9 \times 10^3$ N/cm$^2$ for compressing the composite material sheet so that thicknesses after being compressed may be 0.4 mm, 0.3 mm and 0.25 mm, thus, composite sheets of three types were obtained. Table 1 shows a thickness and specific gravity of each composite material sheet.

TABLE 1

| | Thickness and specific gravity | |
|---|---|---|
| After casting | After compressing (Compression rate) | Specific gravity |
| 0.5 mm Specific gravity 3.5 | 0.4 mm (80%) | 4.4 |
| | 0.3 mm (60%) | 5 |
| | 0.25 mm (50%) | 7 |

Table 1 shows that compression rate of each composite material sheet is different from others, and the thinner the composite sheet is, the higher the specific gravity is.

The composite material sheet obtained in the present example can be applied to composite material sheet 27 arranged on the reverse side 28b of the radiographic image recording panel 28 in the cassette for medical X-ray radiography 40 shown in FIG. 4, and when a thickness of the cassette 40 is restricted, for example, a thickness of the cassette 40 can be made thinner by using a composite material sheet whose thickness is thinner and specific gravity is higher. Further, by using a composite material sheet having the same thickness and greater specific gravity, greater X-ray shielding effects can be obtained. The composite material sheet can naturally be applied also to X-ray shielding section 19 in FIG. 3 in the same way, and the thinner composite sheet or the composite sheet having greater X-ray shielding effects can be applied properly.

Example 2

A composite material sheet having a radiation-shielding effect and high specific gravity was formed after dispersing tungsten powder in a styrene elastomer resin and adding thereto barium sulfate. A weight percentage of each of tungsten powder and barium sulfate is shown in the following Table 2, and two types of composite material sheets and further a composite material sheet having no barium sulfate (0%) were obtained.

Criteria for "Price" and "Thickness" in Table 2 are as follows:

(Price)
  A: Inexpensive
  B: Fair
  C: Expensive (Thickness)
A: Thin
B: Fair
C: Thick

TABLE 2

| Tungsten (Weight %) | Barium sulfate (Weight %) | Price | Thickness |
|---|---|---|---|
| 80 | 20 | A | C |
| 90 | 10 | B | B |
| 100 | 0 | C | A |

The composite material sheet in the present example includes therein tungsten and barium sulfate with which a part of tungsten is replaced, and their prices and thickness are shown in Table 2, wherein tungsten is expensive, while, barium sulfate is considerably low in price and its specific gravity is small, resulting in that the more the barium sulfate is contained, the thicker the sheet is and the lower the price is. Alternatively, the less the barium sulfate is contained, the thinner the sheet is and the higher the price is. It is therefore preferable to determine the barium sulfate content properly based on comparison in prices and thicknesses.

The preferred embodiments of the present invention has been described as above, however, the present invention is not limited thereto, and disclosed embodiments can be varied without departing from the spirit and scope of the present invention. For example, a recording medium to be contained in the cassette in FIG. 4 may be a film for X-ray radiography. Further, in Example 2, a part of tungsten may be replaced with strontium sulfate, calcium tungustate, iron or copper, instead of barium sulfate, which are relatively low in price and exhibit relatively high X-ray shielding property similar to those of barium sulfate.

Example 3

Composite material sheets of the present invention containing 5 to 75% by volume of tungusten powder dispersed in styrene elastomer resin were prepared. In Table 3, the relationship between the tungsten content (% by volume) and the X-ray (tube voltage 90 kVp) absorptance of the composite material sheet per thickness of 0.1 mm is shown.

TABLE 3

| Tungsten content (% by volume) | X-ray absorptance of composite material sheet per thickness of 0.1 mm (%) |
|---|---|
| 5 | 10 |
| 20 | 30 |
| 40 | 50 |
| 65 | 70 |
| 75 | 80 |

What is claimed is:

1. A medical image recording apparatus comprising:
   a recording medium to record an X-ray image transmitted through a subject; and
   an anti-scattering member for X-rays transmitted through the recording medium or an X-ray absorbing member for the X-rays transmitted through the recording medium,
   wherein
   the anti-scattering member or the X-ray absorbing member contains a composite material containing a metal having a specific gravity of not less than 3 excluding lead; and
   an X-ray absorptance of the composite material is 70-99.99%.

2. The medical image recording apparatus of claim 1, wherein an X-ray absorptance of the composite material per thickness of 0.1 mm of the composite material is not less than 10%.

3. The medical image recording apparatus of claim 1, wherein an X-ray absorptance of the composite material per thickness of 0.1 mm of the composite material is not less than 20%.

4. The medical image recording apparatus of claim 1, wherein an X-ray absorptance of the composite material per thickness of 0.1 mm of the composite material is not less than 30%.

5. The medical image recording apparatus of claim 1, wherein an X-ray absorptance of the composite material per thickness of 0.1 mm of the composite material is not less than 50%.

6. The medical image recording apparatus of claim 1, wherein the metal having a specific gravity of not less than 3 excluding lead is partially replaced with a compound having a specific gravity of not less than 3 excluding lead compound in the composite material.

7. The medical image recording apparatus of claim 1, wherein the metal having a specific gravity of not less than 3 excluding lead is metal powder.

8. The medical image recording apparatus of claim 1, wherein the recording medium contains a stimulable phosphor.

9. A cassette for medical radiography enclosing a recording medium to record an X-ray image transmitted through a subject, comprising:
   a front member provided on the subject side of the recording medium;
   a back member being combined with the front member to form an internal space in which the recording medium is installed; and
   a frame member on a circumference of the back member,
   wherein at least one member provided on a side of the recording medium opposite to the subject side comprises a composite material containing a metal having a specific gravity of not less than 3 excluding lead,
   wherein an X-ray absorptance of the composite material is 70-99.99%.

10. The cassette for medical radiography of claim 9, wherein an X-ray absorptance of the composite material per thickness of 0.1 mm of the composite material is not less than 10%.

11. The cassette for medical radiography of claim 9, wherein an X-ray absorptance of the composite material per thickness of 0.1 mm of the composite material is not less than 20%.

12. The cassette for medical radiography of claim 9, wherein an X-ray absorptance of the composite material per thickness of 0.1 mm of the composite material is not less than 30%.

13. The cassette for medical radiography of claim 9, wherein an X-ray absorptance of the composite material per thickness of 0.1 mm of the composite material is not less than 50%.

14. The cassette for medical radiography of claim 9, wherein the metal having a specific gravity of not less than 3 excluding lead is partially replaced with a compound having a specific gravity of not less than 3 excluding lead compound in the composite material.

15. The cassette for medical radiography of claim 9, wherein the metal having a specific gravity of not less than 3 excluding lead is metal powder.

16. The cassette for medical radiography of claim 9, wherein the recording medium contains a stimulable phosphor.

17. The cassette for medical radiography of claim 9, wherein the back member comprises the composite material.

18. The cassette for medical radiography of claim 9, wherein frame member is monolithically formed with the back member using the composite material.

19. The cassette for medical radiography of claim 9, wherein the recording medium is a flat panel detector.

20. The cassette for medical radiography of claim 9, wherein a sheet comprising the composite material is stuck on a surface of the recording medium opposite to the subject side.

21. The cassette for medical radiography of claim 9, wherein the cassette comprises a elastic member on a side of the recording medium opposite to the subject side and the elastic member comprises the composite material.

22. The cassette for medical radiography of claim 9, wherein the recording medium has a support on a side of the recording medium opposite to the subject side and the support comprises the composite material.

23. The cassette for medical radiography of claim 22, wherein a sealing film and a holding member are provided in that order on the support on a side of the recording medium opposite to the subject side and the sealing film and the holding member comprise the composite material.

24. A medical image recording apparatus comprising:
   a recording medium to record an X-ray image transmitted through a subject; and
   an anti-scattering member for X-rays transmitted through the recording medium or an X-ray absorbing member for the X-rays transmitted through the recording medium,
   wherein
   the anti-scattering member or the X-ray absorbing member contains a composite material containing a metal or a compound having a specific gravity of not less than 3 excluding lead or a lead compound; and
   the recording medium contains a stimulable phosphor.

25. A cassette for medical radiography enclosing a recording medium to record an X-ray image transmitted through a subject, comprising:
   a front member provided on the subject side of the recording medium;
   a back member being combined with the front member to form an internal space in which the recording medium is installed, wherein the back member contains a composite material containing a metal or a compound having a specific gravity of not less than 3 excluding lead or a lead compound;
   a frame member on a circumference of the back member,
   wherein the recording medium contains a stimulable phosphor.

* * * * *